Dec. 20, 1949          A. F. ECKEL          2,491,650
INTERCHANGEABLE SCALE FOR SLIDE RULES
Filed June 19, 1947          2 Sheets-Sheet 1
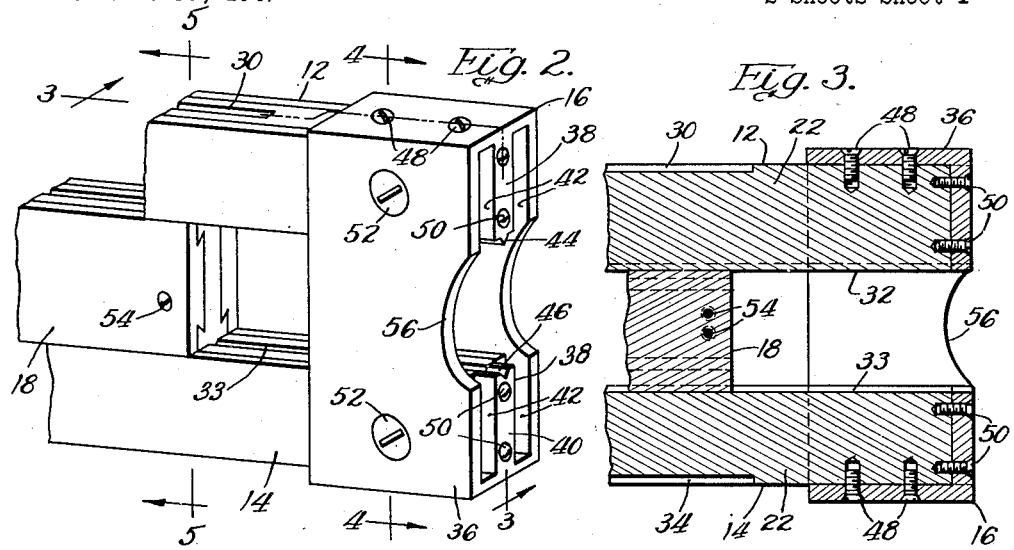
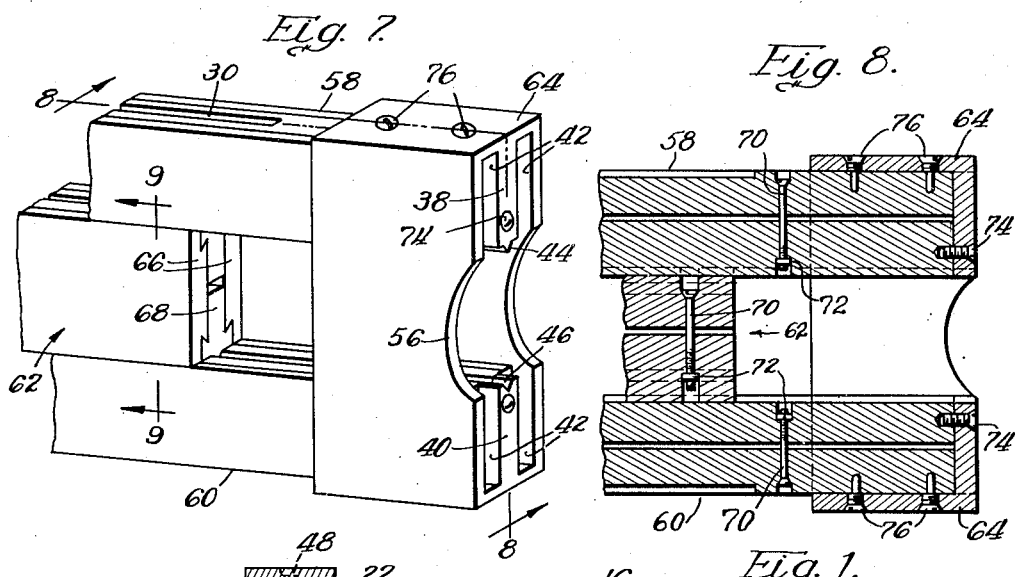
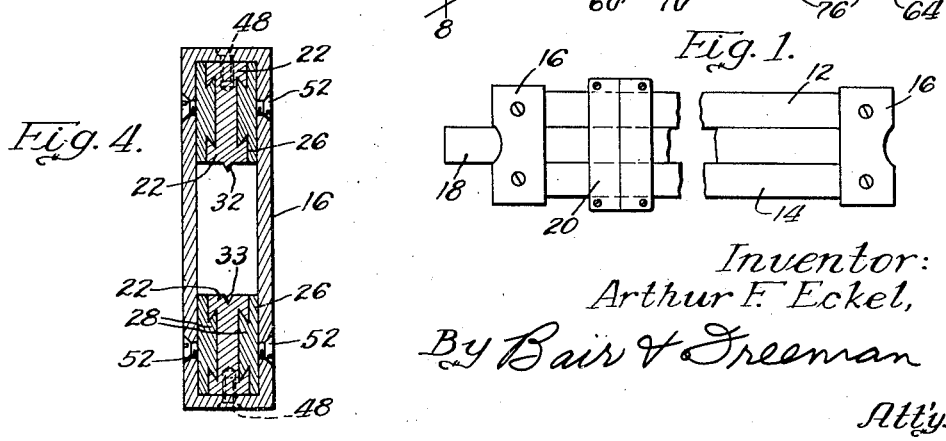
Inventor:
Arthur F. Eckel,
By Bair & Freeman
Att'ys.

Dec. 20, 1949     A. F. ECKEL     2,491,650
INTERCHANGEABLE SCALE FOR SLIDE RULES
Filed June 19, 1947     2 Sheets-Sheet 2
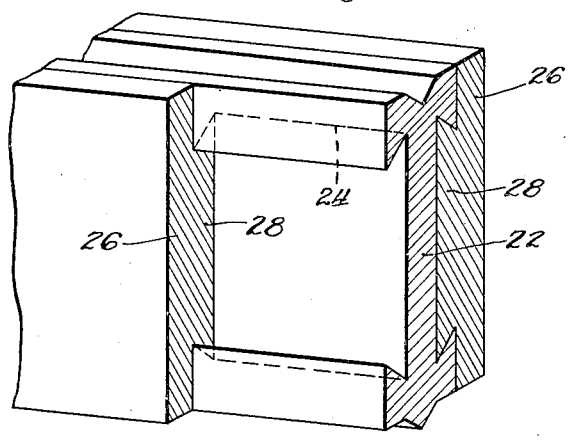
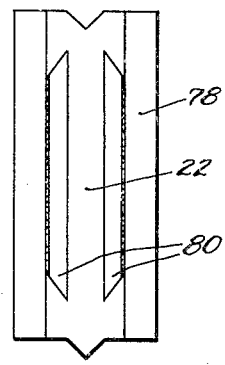
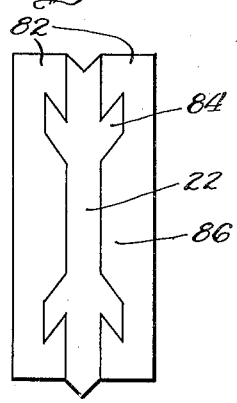
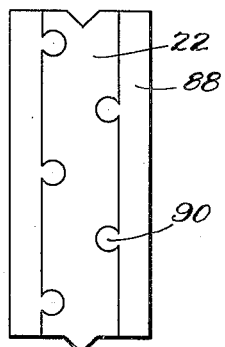
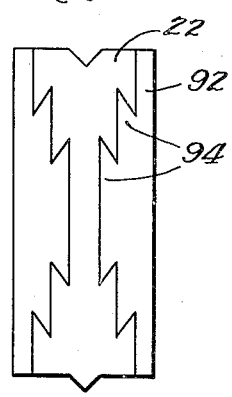
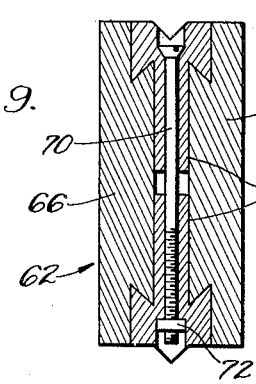
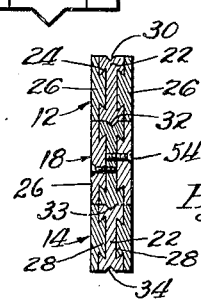
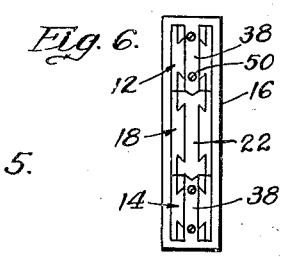
Inventor:
Arthur F. Eckel,
By Bair & Freeman
Att'ys.

Patented Dec. 20, 1949

2,491,650

UNITED STATES PATENT OFFICE 2,491,650

INTERCHANGEABLE SCALE FOR SLIDE RULES

Arthur F. Eckel, Chicago, Ill., assignor to Louise Pickett, La Grange, and Myrtle Eckel, Evanston, Ill.

Application June 19, 1947, Serial No. 755,589

15 Claims. (Cl. 235—70)

1

This invention relates to slide rules in which the scales are removable and replaceable.

An object of the present invention is the provision of a slide rule having a pair of stator elements and a slider, each of which is provided with scales on opposite sides which are removable and replaceable.

Another object is the provision of such a slide rule in which the scales of the stator elements can be removed without otherwise disassembling the slide rule.

A further object of the invention is the provision of such a slide rule in which the slider can be easily removed from the rule and the scales thereon easily removed and replaced.

An additional object is the provision of a slide rule having interchangeable scale pieces and in which the stator elements and the slider are substantial duplicates in construction.

Another object is the provision of a slide rule having interchangeable scales in which the stator elements are secured in position against objectionable displacement.

A still further object of the invention is the provision of simple means for securing the interchangeable scales securely in position against accidental displacement.

A still further object of the invention is the provision of a modified form of slide rule having stator elements and a slider each of which is made up of a core and side scale pieces, the core in each instance being made up of separable halves.

Still another object is the provision of removable scale pieces so constructed and designed as to possess unusual strength.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 1 is a side view of a slide rule constructed in accordance with my invention;

Figure 2 is an isometric view, on an enlarged scale, of one end of a slide rule constructed according to my invention;

Figure 3 is a sectional view taken on line 3—3 of Figure 2;

Figure 4 is a sectional view taken on line 4—4 of Figure 2;

Figure 5 is a sectional view taken on line 5—5 of Figure 2;

Figure 6 is an end view of the rule illustrated in Figure 2;

2

Figure 7 is an isometric view of one end of a slide rule showing a modified structure;

Figure 8 is a sectional view taken on line 8—8 of Figure 7;

Figure 9 is a sectional view taken on line 9—9 of Figure 7;

Figure 10 is an enlarged isometric view of one of the elements making up the slide rule showing details of construction; and Figures 11, 12, 13 and 14 are end views illustrating various modified forms of details of construction.

Referring now in detail to the drawings, Figure 1 shows a slide rule having stator elements 12 and 14 secured together in spaced relation by end pieces 16. A slider 18 cooperates with the stator elements 12 and 14 in the usual manner. A cursor 20 is also provided.

*The embodiment of Figures 2, 3 and 4*

The stator elements 12 and 14 are substantial duplicates of one another, being given different reference numerals to indicate certain relationship and details of construction. The slider 18 is also a substantial duplicate of the stator pieces 12 and 14, with certain slight changes.

Each of the stator elements 12 and 14 contains a core 22 extending the length and width of the respective elements. The core 22 is provided in each of its opposite flat sides with a longitudinally disposed dovetail groove. On opposite sides of the core 22 are removable scale pieces 26 having the same length and width of the core 22. The inner surface of each of the scale pieces 26 is provided with a dovetail tongue 28 adapted to slide onto and cooperate with the respective dovetail groove 24 in the side surfaces of the core 22.

The upper stator element 12 is provided with a longitudinal groove 30 formed in the upper surface of the core 22. The groove 30 need not extend the full length of the core 22, but may terminate short of the end thereof as illustrated in the Figure 2. The lower surface of the core 22 of the stator element 12 is provided with a tongue 32 which extends the full length of the core.

The lower stator element 14 is constructed substantially the same as the upper stator element 12, differing only in having grooves 33 and 34 in the upper and lower surfaces of the core 22. The groove 34, similarly to the groove 30, need not extend the full length of the core but may extend only the distance of the upper groove 30. The cursor 20 is provided with tongue elements which slide in grooves 30 and 34; the length of the grooves 30 and 34 need be only sufficient to permit the cursor to be slid into register with the end scale markings on scale pieces.

The end pieces 16 are secured one on each end of the rule. Each end piece 16 consists of a band of metal 36 rectangular in cross section to conform to the cross sectional contour of the rule. On the open side of the band 36 are a pair of projections 38 formed integral with the band at the outer marginal edges of the stator elements 12 and 14. The projections 38 and 40 extend inwardly toward each other and are disposed centrally of the side portions of the band 36, leaving openings 42 therebetween. The inner end of the extensons 38 and 40 terminate in register with the interfacing surfaces of the cores of the stator elements 12 and 14, the upper projection 38 having a tongue 44 registering with the tongue 32, and the lower projection 40 having a groove 46 in register with the groove 34.

Screws 48 are threaded through the band 36 and into the cores 22 of the stator elements 12 and 14 for securing the stator elements in place in the end piece 16. Additional screws 50 are threaded through the projections 38 and 40 and into the end surfaces of the cores 22 of the stator elements 12 and 14.

The scale pieces 26 on the stator elements 12 and 14 are retained against displacement by the tongue and groove elements 24 and 28 in all directions except longitudinally of the stator elements. For securing the scale pieces on the stator elements against longitudinal displacement, screws 52 are threaded through the side portions of the end pieces 16. The screws 52 are short with rounded inner ends which extend barely past the inner surfaces of the band 36 of the end piece 16 to engage the outside surfaces of the scale pieces. This relationship is clearly shown in Figure 4.

To remove the scale pieces 26 from the stator elements 12 and 14, the screws 52 are loosened and the scale pieces are slid out through the spaces 42 in the end pieces 16. The spaces 42 are wide enough to accommodate the thickest portions of the scale pieces which includes the tongue element 28, as clearly illustrated in Figure 6.

The scale pieces 22 on the slider 18 similarly to the scale pieces on the stator elements are retained against displacement by the tongue and groove elements therein in all directions except longitudinally of the slider, and are retained against longitudinal displacement by screws 54 inserted and threaded through the scale pieces and into the core 22 of the slider, adjacent the ends of the slider. Obviously the slider 18 is free to slide out through the end pieces 16, as is common in all slide rules. The end pieces 16 are further provided with curved cutout portions 56 for ease in grasping the slider for sliding it out.

The embodiment of Figures 7, 8 and 9

The modification illustrated in Figures 7, 8 and 9 differs from the previous modification in having cores in the stator elements and slider which are made of separable parts. The present modification of slide rule includes stator elements 58 and 60, and a slider 62. End pieces 64 are substantial duplicates of the end pieces 16. The stator elements 58 and 60 each comprises scale pieces 66 which are duplicates of the scale pieces 26. The core 68 is made up of two parts each of which extends longitudinally through the respective elements. The parts of the core 68 are disposed on opposite sides of a longitudinal plane positioned perpendicular of the plane of the scale pieces. Adjacent each end of the core 68 is a draw screw 70 having a slotted head on one end and a threaded portion on the other end engageable by a nut 72. The nut 72 is polygonal and fits in an enlarged portion of the opening through the core. By tightening the draw screw 70 the parts of the core 68 are drawn together and the tongue and groove elements on the core and scale pieces 66 retain the scale pieces against displacement in all directions. As illustrated in Figure 8 the screws 70 in the stator elements 58 and 60 are disposed inwardly from the ends of the rule beyond the end pieces 64 so that the user may manipulate the screws when the rule is in assembled condition.

The stator elements 58 and 60 are secured in the end pieces 64 by screws 74 threaded through the projections 38 and 40. One set screw 74 is provided for each stator element and is threaded in the inner half of the core therein. Screws 76 are provided with stems fitting loosely in holes in the outer halves of the cores, to permit the outer portions of the cores to be moved relative to the inner portions thereof. The inner portions of the cores of the stator elements 58 and 60 are fixed in position to determine the space between the stator elements for proper sliding engagement of the slider. The outer halves of the cores are thereby permitted limited outward movement within the end pieces 64 for separation from the inner halves and releasing the binding effect of the tongue and groove elements between the cores and the scale pieces. The scale pieces 66 can then be slid out through the spaces 42 in the end pieces 64. The screws 74 fix the stator elements rigidly in the end pieces 64, and the screws 76 prevent the stator elements from twisting.

The construction of the slider 62 is similar to the stator elements 58 and 60.

Detailed constructions of Figures 10 to 14, inclusive

Figure 10 is an enlarged detailed view showing the general form of core and scale pieces employed in the previous modifications, and particularly that form shown in Figures 2, 3 and 4. It will be noted that the scale pieces 26 in Figure 10 are provided with tongue elements 28 which are formed integral with the main portion of the scale pieces. Preferably the core 22 is made of metal and the scale pieces 26 are made of plastic. The scale pieces and metal core may be milled or extruded depending upon the method of manufacture preferred.

Figure 11 illustrates a core 22 and scale pieces 78. The scale pieces 78 are preferably plastic and the tongue elements thereon are preferably metal. The tongue elements 80 may be secured to the main portions of the scale pieces 78 by a laminating process.

Figure 12 illustrates scale pieces 82 in which the tongue elements 84 are formed on the core 22 and the groove elements are formed in scale pieces. In the event the scale pieces 82 are of unusually thin material an arrangement such as here illustrated may be employed in which the tongue elements 84 are each formed of two portions, leaving a thickened portion 86 at the center of the scale pieces to provide added strength.

Figure 13 shows scale pieces 88 having bead elements 90 thereon fitted in corresponding grooves in the core 22. If desired, the beads 90 may be greater than half a cylinder so that the scale pieces are retained in position thereby.

Figure 14 shows scale pieces 92 having double tongue elements 94 formed thereon fitting in corresponding grooves in the core 22. This illustration is another means of providing additional strength in the scale pieces at the center thereof if the scale pieces are of unusually thin material.

While I have herein shown and described certain preferred embodiments of my invention, manifestly they are susceptible of certain modification without departing from the spirit and scope thereof. I do not, therefore, wish to be understood as limiting my invention to the precise forms herein disclosed, except as I may be so limited by the appended claims.

I claim as my invention:

1. A slide rule comprising, in combination, a pair of stator elements, a slider, said stator elements and slider each comprising a central core and side scale pieces, means removably securing said scale pieces to the respective cores, and an end piece at each end of the rule, each end piece comprising a band surrounding said stator elements, said band having projections, positioned for abutting the end surfaces of the cores of said stator elements and being secured thereto.

2. A slide rule comprising, in combination a pair of stator elements, end pieces secured to the ends of said stator elements for securing the latter together in spaced relation, and a slider slidable in said stator elements and through said end pieces, the meeting surfaces of said stator elements and slider having intercooperating tongue and groove elements, said slider comprising a core and side scale pieces, the core and scale pieces of said slider having intercooperating dovetail tongue and groove elements, and means for securing said scale elements against longitudinal displacement on said core.

3. A slide rule comprising, a pair of stator elements and a slider, said stator elements each comprising a core and side scale pieces, end pieces at each end of the rule, said end pieces being secured to the ends of said cores and having openings therein for removing said scale pieces therethrough, and means in said end pieces for removably securing said scale pieces to the respective cores.

4. A slide rule comprising, a pair of stator elements and a slider, each of said stator elements comprising a core and side scale pieces, a cap at each end of the rule fitted over the ends of said stator elements, each of said caps being secured to the respective ends of the stator elements in the end surfaces thereof and in the side surfaces adjacent the ends thereof, each of said caps having openings therein for removal of said scale pieces and said slider therethrough, and means in said caps for removably securing said scale pieces to the respective cores.

5. A slide rule element comprising, an elongated core having side and edge surfaces, a scale piece on each side surface of said core, said core and scale pieces having intercooperating tongue and groove elements, and means for securing said core and scale pieces against relative longitudinal displacement.

6. A slide rule comprising, elongated stator elements and a slider, said stator elements and slider each comprising a core and side scale pieces, the respective cores and side scale pieces having intercooperating tongue and groove elements, each core consisting of two separable parts movable toward and away from each other, means for securing the parts of each core together, and means for securing the stator elements together in spaced relation.

7. A slide rule comprising, a pair of elongated stator elements and a slider cooperable therewith, said stator elements and slider each comprising a core and side scale pieces, each scale piece having a dovetail tongue element formed on the inner surface and extending lengthwise thereof, each core being formed of two longitudinally extending parts, each of said parts having formed on each side thereof a longitudinal groove, the grooves on respective sides of said parts together forming a dovetail groove element cooperable with the tongue element on the respective side scale piece, said parts being movable toward and away from each other, means interconnecting said parts for drawing them together, and means for securing the stator elements together in spaced relation.

8. A slide rule element comprising, an elongated core and cooperating side scale pieces, each scale piece having a dovetail tongue element on the inner side and extending longitudinally thereof, said core being formed of two longitudinally extending parts disposed on opposite sides of a plane perpendicular to said side scale pieces, each part having a groove formed in each side thereof, the grooves on respective sides of said parts together forming dovetail groove elements cooperable with the tongue elements on respective side scale pieces, and means for drawing said parts together.

9. A slide rule comprising, in combination, a pair of stator elements, a slider supported by and slidable in said stator elements, said stator elements and slider each comprising a central core and side scale pieces, each of said cores and the respective side scale pieces having intercooperating tongue and groove elements, the meeting surfaces of the cores of said stator elements and slider having intercooperating tongue and groove elements, and an end piece at each end of the rule, each end piece comprising a band surrounding the rule, the open side of said band adjacent the end of the rule having projections formed on the edges thereof adjacent the outer edges of said stator elements and extending toward each other and terminating adjacent the inner edges of said stator elements, there being spaces between said projections and the sides of the band for removal therethrough of the scale pieces from said stator elements, and means for securing said scale pieces against longitudinal displacement on the respective cores.

10. A slide rule comprising, in combination, a pair of stator elements, a slider supported between said stator elements, said stator elements and slider each comprising a central core and side scale pieces, each of said cores and the respective side scale pieces having intercooperating dovetail tongue and groove elements, the meeting surfaces of the cores of said stator elements and slider having intercooperating tongue and groove elements, and an end piece at each end of the rule, each end piece comprising a band surrounding the rule, the open side of said band adjacent the end of the rule having projections formed on the edges thereof adjacent the outer edges of said stator elements and extending toward each other and terminating adjacent the inner edges of said stator elements, there being spaces between said projections and the sides of the band for removal therethrough of the scale pieces from said stator elements, the end surfaces of the cores of said stator elements being secured to respective ones of said projections, the outer surfaces of the cores of said stator elements adjacent the ends thereof being secured to respective sides of said bands, and means for securing said scale pieces against longitudinal movement on the respective cores.

11. A slide rule comprising, elongated stator elements and a slider, said stator elements and slider each comprising a core and side scale pieces, the respective cores and side scale pieces having intercooperating tongue and groove elements, each core consisting of a unitary piece, and means for securing the stator elements together in spaced relation.

12. A slide rule element comprising, an elongated core having side and edge surfaces, said core consisting of a unitary piece, a scale piece on each side surface of said core, said core and scale pieces having intercooperating tongue and groove elements, and means for securing said core and scale pieces against relative longitudinal displacement.

13. A slide rule comprising, in combination, a pair of stator elements, means for securing said stator elements together in spaced relation, each stator element comprising a central core and side scale pieces, means removably securing said scale pieces to the respective cores, and a slider carried by and slidable in said stator elements.

14. A slide rule comprising, in combination, a pair of stator elements, means for securing said stator elements together in spaced relation, and a slider carried by and slidable in said stator elements, said slider comprising a central core and side scale pieces, and means removably securing said scale pieces to said core.

15. A slide rule comprising, in combination, a pair of stator elements, means for securing said stator elements together in spaced relation, and a slider carried by and slidable in said stator elements, said stator elements and slider each comprising a central core and side scale pieces, and means removably securing said scale pieces to the respective cores.

ARTHUR F. ECKEL.

REFERENCES CITED

The following references are of record in the file of this patent:

UNITED STATES PATENTS

| Number | Name | Date |
|---|---|---|
| 907,373 | Keuffel | Dec. 22, 1908 |
| 1,150,771 | Keuffel | Aug. 17, 1915 |
| 1,875,927 | Keuffel | Sept. 6, 1932 |

FOREIGN PATENTS

| Number | Country | Date |
|---|---|---|
| 567,493 | France | Dec. 7, 1923 |